United States Patent [19]

Kesling

[11] 4,217,792
[45] Aug. 19, 1980

[54] STEERING COLUMN FOR VEHICLES

[75] Inventor: Keith Kesling, Utica, Mich.

[73] Assignee: General Motors Corporation, Detroit, Mich.

[21] Appl. No.: 936,373

[22] Filed: Aug. 24, 1978

[51] Int. Cl.² ............................................. B62D 1/18
[52] U.S. Cl. .................................. 74/484 R; 29/453; 74/493; 280/775; 280/779
[58] Field of Search ............... 74/484, 485, 486, 487, 74/492, 493; 29/453; 280/775, 779; 180/78

[56] References Cited

U.S. PATENT DOCUMENTS

| | | | |
|---|---|---|---|
| 3,313,587 | 4/1967 | Mongesku et al. | 29/453 X |
| 3,760,647 | 9/1973 | Ehrhardt | 74/485 |
| 3,857,454 | 12/1974 | Kobayashi | 180/78 |
| 4,086,825 | 5/1978 | Badcock et al. | 74/492 |

Primary Examiner—Allan D. Herrmann
Attorney, Agent, or Firm—Charles R. White

[57] ABSTRACT

A steering column for a vehicle having an enlarged thin-walled bottom panel removably secured to a generally rectangular housing. With the panel removed, the turn signal switch, universal joint and other components mounted within the housing can be easily serviced without removal of the handwheel or other major column components. End caps slidably fit on tracks on the upper ends of the bottom panel and the housing to secure these parts to each other and to close the upper part of the column. This column provides for multiple controls including tilt adjustment closely adjacent to the handwheel to facilitate operation of the vehicle.

3 Claims, 5 Drawing Figures

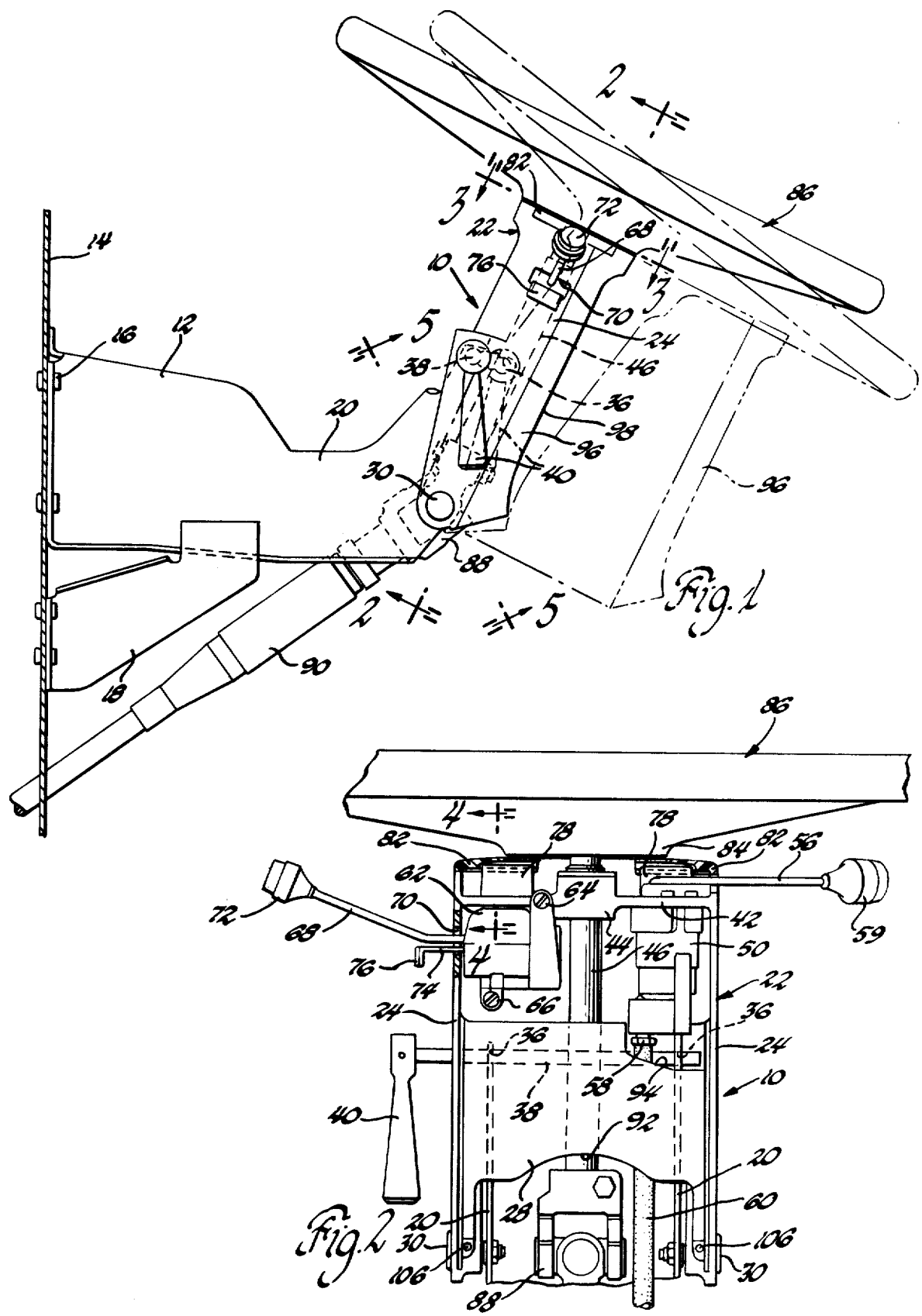

STEERING COLUMN FOR VEHICLES

This invention relates to vehicle steering columns and more particularly to a new and improved steering column assembly sized to accommodate and internally house the steering shaft universal joints, tilt adjustment, signal switches and other control mechanisms and to provide for optimized access for service of such mechanisms without removal of the steering wheel operatively mounted at the top of the column.

Prior to the present invention, many truck and tractor steering column assemblies had various control mechanisms which were clamped or otherwise fastened to the exterior of the column. Also, many of these columns had coaxial concentric assemblies as part of the basic steering column housing. The assembling and servicing of components such as the steering shaft, universal joint, turn signals and brake valve mechanisms often required that the handwheel and the coaxial concentric assemblies be removed to provide service for the column supported components. This was both time consuming and costly from a service or maintenance standpoint. Other prior columns and their housings were bulky and sizewise detracted from cab entrance and egress and often further complicated the repair and maintenance of steering column mounted components.

Accordingly, it is a feature, object and advantage of this invention to provide a new and improved steering column assembly to house control mechanisms within the column and to provide improved access for service for such components without removal of the column steering wheel.

Another feature, object and advantage of this invention is to provide a new and improved steering column assembly with an improved column housing and a removable panel on the underside thereof to provide access to improve the assembling and servicing of any displays, control components such as gear shift levers, turn signal indicators, braking valve, cruise control, high and low beam indicators mounted within said housing, without removal of the steering wheel.

Another feature, object and advantage of this invention is to provide a new and improved mounting of the cover plate on the underside of the steering column housing to enclose and protect vehicle control components as well as providing a streamlined appearance. The cover may be padded or fabricated from a semi-rigid energy absorbing material, furthermore, the column of this assembly provides increased cab clearance with narrowed front to back dimensions to improve operator entrance and egress from the vehicle.

Another feature, object and advantage of this invention is to provide a new and improved steering column assembly for a vehicle having a tiltable column housing with manual tilt controls therein close to the handwheel to facilitate column adjustments and having a removable one-piece, thin-walled access plate forming the lower surface of the column and retained at one end to the column housing by slidable cap means and readily removable to facilitate inspection and maintenance of components housed within the column.

These and other features, objects and advantages of this invention will be more apparent from the following detailed description and drawings in which:

FIG. 1 is a side elevational view of a steering column assembly of a vehicle in accordance with this invention;

FIG. 2 is a view partially in section taken along lines 2—2 of FIG. 1;

Figure 5:
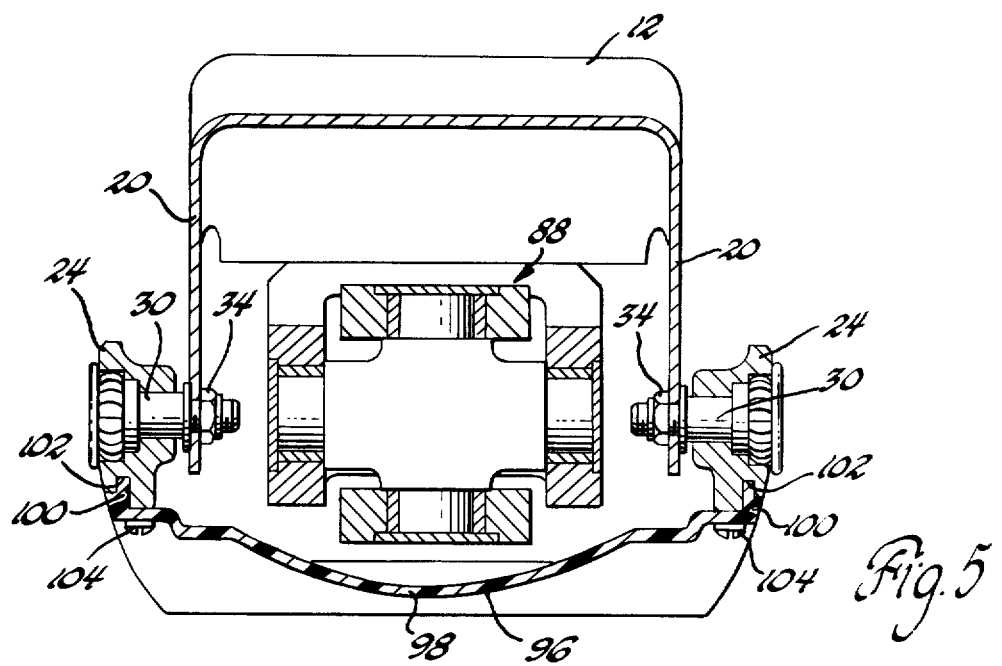
FIG. 5 is a view partly in cross section taken along lines 5—5 of FIG. 1.

Turning now in greater detail to the drawings, there is shown in FIG. 1, a steering column assembly 10 having a cantilevered support bracket 12 generally box-like in shape having a front end portion secured to a forward wall 14 of a vehicle cab by fastener means 16. The bracket 12 is further supported by a brace 18 which extends angularly from connection with the forward wall 14 into attachment with a lower portion of the support bracket as shown in FIG. 1. The steering column support bracket 12 is formed with parallel sides extending longitudinally from the forward wall which terminate in upwardly extending and laterally spaced arm portions 20. Pivoted to the support bracket 12 is a steering column housing 22 in the form of an elongated metallic shell having laterally spaced sides 24 interconnected by a lower web 28 cut away as shown in FIG. 2 to provide access to components within the housing as will be further described below. FIG. 5 discloses the pivot bolts 30 that extend inwardly from a lower extremity of the sides 24 of the housing through suitable openings formed in the arm portions of the support bracket to pivotally mount the column housing to the support bracket. The inboard ends of pivot bolts 30 are threaded for receiving the retainer nuts 34 installed inside of the arm portions 20. The laterally spaced arm portions 20 of the support bracket 12 incline upwardly into the interior of the column housing and each is provided with an arcuate slot 36 that receives a transversely extending locking rod 38 of a column tilt lock assembly having a manual lever 40 secured to the rod 38 adjacent to the left side 24 of housing 22 closely adjacent the steering wheel. The locking rod extends laterally from lever 40 through suitable openings formed in the arm portions of the support bracket and the arcuate slots 36. By manually turning the locking lever 40 upwardly, a reduced diameter portion of the rod is aligned with gates formed in the arcuate slots 36 so that the column housing 22 can be turned on the pivot axis provided by pivot bolts 30. By releasing the lever, a torsion spring, not shown, swings the locking lever to the down position whereby a large diameter portion of the locking lever is engaged in a corresponding circular recess in the arcuate slot to thereby hold the column housing in an adjusted position.

The steering column housing 22 also has a laterally extending top web 42 connecting the side walls 24 thereof. This web has a centralized cylindrical journal 44 which rotatably supports the upper steering shaft 46 and a circular opening 48 through which the upper end of the cylindrical housing of the trailer brake valve 50 extends. The valve housing has an annular flange 52 that seats against the lower face of web 42. Fasteners 54 extending through the web 42 thread into flange 52 to removably secure the valve 50 to the column housing 22. An elongated manual lever 56, operatively secured to the upper end of the trailer brake valve 50, projects laterally outwardly from the column housing. This lever has a manual knob 59 secured to the free end thereof which can be grasped to facilitate the turning of lever 56. This turns the valve body to accordingly activate or deactivate the trailer brakes or other device controlled by the valve 50. As shown in FIG. 2, the valve 50 is pneumatically connected by fitting 58 to the trailer brakes by a line 60 which extends within the column housing and accordingly is protected thereby.

In addition to supporting the trailer brake valve 50, the steering column housing 22 supports a turn signal and hazard switch assembly 62. As shown in FIG. 2, threaded fasteners 64 and 66 threaded into the side of web 42 and into the top of the switch assembly 62 removably secures that assembly within the steering column housing. This switch assembly has a turn signal lever 68 extending laterally therefrom through an opening 70 formed in the side wall 24 of the housing. The free end of this lever has a knob 72 secured thereto. By manually grasping the knob, the lever 68 can be readily turned in a clockwise or counterclockwise direction to activate the turn signal switch and the vehicle turn signals controlled thereby. In addition to the lever 68, the switch assembly 62 has a slidable switch control arm 74 extending outwardly through the opening 70 and terminating in a manual down turned finger grip 76. By manually pulling the switch control arm outwardly, the hazard flashers on the vehicle can be activated and by returning the arm to its original position the flashers are accordingly deactivated. The wiring for this switch assembly is not shown, however, such is routed within the protection of the steering column housing 22.

Extending upwardly from the web 42 of the steering column housing are a pair of laterally spaced projections 78. The upper edges of these projections are under cut to provide tracks 80 for the attachment of left and right hand caps 82 which slidably fit on and protectively close the end of the steering column housing 22. The inboard end of these caps have a curvature to match that of the cylindrical hub 84 of the steering wheel assembly 86. The steering wheel assembly as shown best in FIG. 2 has close proximity to the turn signal and trailer brake levers, the hazard switch arm and the tilt adjustment handle for efficient operation by the vehicle operator. The steering wheel assembly is drivingly connected to the upper end of the upper steering shaft 46. The lower end of this steering shaft is connected by a universal joint 88 to a lower steering shaft and boot assembly 90. The lower steering shaft is drivingly connected to the steering gear of the vehicle which is not illustrated. In viewing FIG. 2, the web 28 is cut away at 92 and 94 to provide access to the universal joint 88 and the air line fitting 58.

Completely closing the underside of the steering column housing 22 is a thin-walled cover plate 96 of a suitable plastic material. This cover plate is a shell-like member having a generally rectangular exterior surface 98 slightly convexly curved and having side edge portions 100 which are angularly disposed with respect to the exterior surface to fit into grooves 102 formed in the side walls 24 of the steering column housing. Fasteners 104 which thread through the cover plate into openings 106 in the lower portion of the web 28 secure the lower end of the cover plate 96 to the steering column housing as shown in FIG. 5. The upper end of the cover plate is attached to the top web 42 of the column housing by threaded fasteners 108 and 110 which extend through tabs 112 and 114, integral with cover plate 96, into the web 42.

Figure 3:
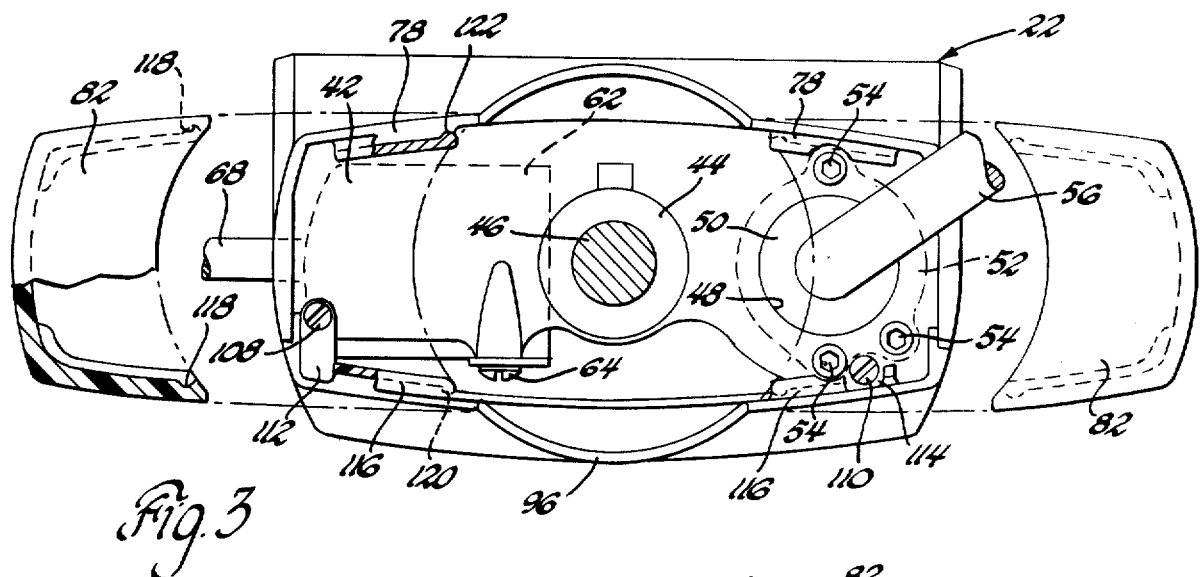
FIG. 3 is a view taken along lines 3—3 of FIG. 1.
Figure 4:
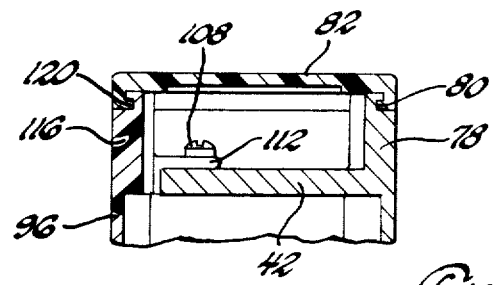
FIG. 4 is a view partly in cross section taken along lines 4—4 of FIG. 2.

The upper end of the cover plate is formed with a pair of projections 116 that correspond to the upward projections 78 of the steering column housing. As with projections 78, the cover plate projections 116 are undercut at 120 to form tracks for the end caps 82. As best shown in FIG. 4, the end caps have hooked edge portions which slidably fit in the tracks of the projections 78 and 116. With this mating track construction, the caps may be inserted axially from the full line position in FIG. 3 to the installed position of FIG. 2 to close the upper end of the column and to provide a finished appearance. In the installed position, the detent notches 118 in the tracks of the end caps releasably engage the semi-circular protrusions 120 and 122 on the tracks of the cover plate and column housing to hold the end caps in the installed position.

From the above, it will be appreciated that the end caps can be removed laterally from their installed position to initiate removal of the cover plate from the column housing and to provide access to the cover plate screws 108 and 110. These screws and the lower screws 104 can be laterally removed with simple tooling so that the cover plate can be removed from the underside of the steering column housing. With the cover plate removed, there is the convenient access and ample clearance with respect to the trailer brake valve 50, the turn signal and hazard switch assembly 62, universal joint 88, the hose fitting 58 and the tilt adjustment. These parts can be quickly serviced without removal of components such as the steering wheel. After removal and reinstallation of such controls, the cover plate and end caps can be quickly put back into place by reversing the procedure above. The column of this invention has a narrow width so that there is no interference with operator entry into or exit from the cab. With the controls fully housed and protected by the column housing, the cooperating cover plate and end caps, this invention provides for a finely finished appearance while facilitating operation of the tilt control of the column.

While a preferred embodiment of this invention has been shown and described to illustrate the invention it will be appreciated by those skilled in the art and that this invention is limited only by the scope of the following claims.

I claim:

1. A steering column assembly for a vehicle comprising a support secured within said vehicle, an elongated steering column housing having a lower end operatively connected to said support and extending generally upwardly therefrom to a terminal and upper end, rotatable steering shaft means extending through said column housing and terminating above the upper end thereof, handwheel means operatively connected to the steering shaft above the upper end of said steering column housing, control means connected to and within said steering column housing, an enlarged access panel removably secured to said steering column housing and forming the under side of steering column to provide access to said control means to facilitate the inspection and removal and reinstallation of said control means with respect to the interior of said steering column housing, and end cap means removably connected to upper portion of said steering column housing and said access panel to secure said access panel to said steering column housing and to close the upper end of said steering column.

2. A steering column assembly for a vehicle comprising a support secured within said vehicle, an elongated steering column housing having a lower end operatively connected to said support and extending generally upwardly therefrom to a terminal and upper end, rotatable steering shaft means extending through said column housing and terminating above the upper end thereof, handwheel means operatively connected to the steering shaft above the upper end of said steering column housing, control means connected to and within said steering column housing, an enlarged access panel for said housing, fastener means securing said access panel to said steering column housing to provide access to said control means within said housing to facilitate removal and repair and reinstallation of said control means into the interior of said steering column housing, and end cap means slidably connected to upper portion of said steering column housing and said access panel to secure said access panel to said steering column housing and to close the upper end of said steering column.

3. A steering column assembly for a vehicle comprising a support secured within said vehicle, an elongated steering column housing having a lower end operatively connected to said support and extending generally upwardly therefrom to a terminal and upper end, rotatable steering shaft means extending through said column housing and terminating above the upper end thereof, handwheel means operatively connected to the steering shaft above the upper end of said steering column housing, control means connected to and within said steering column housing, an enlarged access panel removably secured to said steering column housing and forming the under side of steering column to provide access to said control means to facilitate inspection and removal of said control means from the interior of said steering column housing, and a pair of end cap means for closing the upper end of said steering column, each of said end cap means having a pair of laterally spaced and inwardly facing track means, and cooperating track means on said access panel and said column housing to slidably mate with said track means of said cap means to permit said cap means to be laterally moved from an installed position on said column to initiate removal of said panel from said housing.

* * * * *